United States Patent [19]

Smith

[11] Patent Number: 5,256,197
[45] Date of Patent: Oct. 26, 1993

[54] ABRASION-RESISTANT SYNTHETIC ARTICLE AND METHOD OF MAKING

[75] Inventor: Charles L. Smith, Conshohocken, Pa.

[73] Assignee: Conversion Systems, Inc., Horsham, Pa.

[21] Appl. No.: 717,399

[22] Filed: Jun. 19, 1991

[51] Int. Cl.$^5$ ............................................... C04B 18/06
[52] U.S. Cl. ................................... 106/708; 106/697;
106/705; 106/792; 106/795; 106/DIG. 1;
264/DIG. 49; 501/155
[58] Field of Search ............... 106/697, 705, 707, 708,
106/792, 795, DIG. 1; 264/DIG. 49; 501/155

[56] References Cited

U.S. PATENT DOCUMENTS

| | | |
|---|---|---|
| Re. 30,943 | 5/1982 | Nicholson ...................... 106/DIG. 1 |
| 1,942,770 | 1/1934 | Peffer et al. ................... 106/DIG. 1 |
| 2,564,690 | 8/1951 | Havelin et al. ...................... 106/707 |
| 3,076,717 | 2/1963 | Minnick ......................... 106/DIG. 1 |
| 3,230,103 | 1/1966 | Minnick ............................... 106/707 |
| 3,501,323 | 3/1970 | Moorehead ....................... 106/707 |
| 3,642,445 | 2/1972 | Muter et al. .................... 106/DIG. 1 |
| 3,720,609 | 3/1973 | Smith et al. .......................... 106/706 |
| 3,785,840 | 1/1974 | Minnick ......................... 106/DIG. 1 |
| 3,962,080 | 6/1976 | Dulin et al. .................... 106/DIG. 1 |
| 4,018,619 | 4/1977 | Webster et al. ...................... 106/710 |
| 4,038,095 | 7/1977 | Nicholson ............................ 106/707 |
| 4,049,462 | 9/1977 | Cocozza ............................... 106/715 |
| 4,058,406 | 11/1977 | Raponi ..................................... 524/8 |
| 4,101,332 | 7/1978 | Nicholson ...................... 106/DIG. 1 |
| 4,171,951 | 10/1979 | Lin ........................................... 423/77 |
| 4,226,630 | 10/1988 | Styron ............................ 106/DIG. 1 |
| 4,250,134 | 2/1981 | Minnick ............................... 106/707 |
| 4,316,813 | 2/1982 | Voss ..................................... 252/189 |
| 4,344,796 | 8/1982 | Minnick ............................... 106/709 |
| 4,354,876 | 8/1982 | Webster ............................... 106/708 |
| 4,375,986 | 3/1983 | Pichat ............................ 106/DIG. 1 |
| 4,377,414 | 3/1983 | Buschmann et al. ................. 106/710 |
| 4,387,653 | 6/1983 | Voss ..................................... 423/230 |
| 4,394,176 | 7/1983 | Loggers ............................... 106/797 |
| 4,397,801 | 8/1983 | Minnick ............................... 106/708 |
| 4,419,312 | 12/1983 | Loggers et al. ......................... 264/82 |
| 4,482,096 | 11/1984 | Lin ......................................... 241/65 |
| 4,490,178 | 12/1984 | Loggers et al. ............... 106/DIG. 1 |
| 4,496,267 | 1/1985 | Gnaedinger ......................... 106/710 |
| 4,514,307 | 4/1985 | Chestnut et al. ............. 106/DIG. 1 |
| 4,613,374 | 9/1986 | Smith .............................. 106/DIG. 1 |
| 4,624,711 | 11/1986 | Styron ............................ 106/DIG. 1 |
| 4,683,006 | 7/1987 | Walker ................................. 106/710 |
| 4,741,782 | 5/1988 | Styron ................................. 106/707 |
| 4,770,709 | 9/1988 | Loggers .......................... 106/DIG. 1 |
| 4,770,831 | 9/1988 | Walker ........................... 106/DIG. 1 |
| 4,877,453 | 10/1989 | Loggers ............................... 106/710 |
| 4,917,733 | 4/1990 | Hansen ................................ 106/707 |
| 4,941,772 | 7/1990 | Roesky et al. ....................... 106/707 |

OTHER PUBLICATIONS

Templite Catalyst—A New Construction Material, Temple and Syron (Note: The citation for this reference is not known by inventors).
Fly Ash Lightweight Aggregate: A New Process—Styron, Proceedings of the Seventh International Ash Utilization Sumposium & Exposition, vol. II (May 1985) pp. 834 to 844.
The Manufacture and the Use of Artificial Aggregates from Fly Ash Produced According to the Dutch Cold Bonded "Aardelite" Process-Boas and Spanjer, Proceedings British Ash Symposium (1984).
Light Weight Aggregate Prod. and Use in Florida-Hay and Dunstan, Proceedings, 9th Internt'al Ash Symposium (1991).
Fly Ash Lightweight Aggregate: The Agglite Process-Styron, Proceedings, 8th International Ash Utilization Symposium (1987) pp. 58-1 to 58-12.
The Aggregate of the Future is Here Today-Courts, Proceedings, Ninth International Ash Utilization Symposium (1991) pp. 21-1 to 21-10.
Utilization Symposium (1991) pp. 22-1 to 22-10.
Artificial Gravel as a Gravel Substitute in Asphaltic and Concrete-Mulder and Houtepen, Proceedings, 9th International Ash Utilization Symposium (1991) pp. 23-1 to 23-11.
Synthetic Gravel from Dry Fly Gas Desulfurization End-Products-Donnelly, Tons and Webster, Proceedings, The Challenge of Change—6th Internat'al Ash Utilization Symposium (1982), pp. 187 to 207.
Utilization of Advanced SO2 Control-by-Products: Laboratory Test Results—Manz, Collings, Perri, and Golden, Proceedings: Eighth Int'l Ash Utilization Symposium, vol. 1 (1987) pp. 8-1 to 8-19.
Testing of Manufactured Gravel for Products Specification in Israel—Boas, Ninth Ash Symposium (1991). pp. 24-1 to 24-13.

Primary Examiner—Mark L. Bell
Assistant Examiner—Michael A. Marcheschi
Attorney, Agent, or Firm—Ratner & Prestia

[57] ABSTRACT

A process for the production of a water-insoluble, abrasion-resistant, synthetic solid article or aggregate, as well as the products produced thereby. Fly ash, lime, water and FGD sludge are mixed intimately and formed at pressures exceeding 1,000 psi, preferably 4000-8000 psi. The product is cured for at least the equivalent of 28 days at 73° F., and crushed and sized to produce a commercial aggregate, for example, for concrete, asphalt, concrete masonry units, etc.

18 Claims, No Drawings

ND METHOD OF MAKING

ABRASION-RESISTANT SYNTHETIC ARTICLE AND METHOD OF MAKING

BACKGROUND OF THE INVENTION

This invention pertains to abrasion-resistant cementitiously hardened products and to methods of making such cementitiously hardened products. Flue gas desulfurization (FGD) sludge is incorporated in the composition of the present invention, and the product is a synthetic aggregate.

The concept of removing sulfur oxides from the exhaust of coal-burning power stations by exposing those exhaust gases to an aqueous suspension of lime or limestone is well known. The by-product of this process, FGD sludge, is a problem. Disposal and contamination of groundwater by FGD sludge are primary concerns.

In a well known disposal method, FGD waste is interblended with fly ash, often derived from the same power station, and lime to form a cementitious mixture. The resulting mass, which typically has a damp soil-like consistency, is conveyed to a landfill site, where it is spread and compacted. Pozzolanic and sulfopozzolanic reactions take place in the compacted material to generate a load bearing capability which is measured in the laboratory as unconfined compressive strength. In addition, the pore space within the compacted mass is reduced as reaction products fill the voids; this reduces the permeability coefficient, thereby reducing possible percolation of rainwater into the water table carrying dissolved species. It has also been proposed that the inter-mixed cementitious mass be used to form synthetic aggregate (see, for example, U.S. Pat. No. 3,785,840).

Attempts to make synthetic aggregate from FGD waste-fly ash-lime compositions have been unsuccessful due to the relative softness or friability of the aggregate so generated. An approach for improving permeability coefficients and, incidentally, unconfined compressive strength of hardened products, formed from such compositions, is disclosed in U.S. Pat. No. 4,613,374 (of common assignment and common inventorship herewith).

Known (to applicants) previous attempts to use cementitiously hardened FGD sludge-fly ash-lime compositions as synthetic aggregate have been unsuccessful, largely due to softness of the aggregate produced even after the material is removed from cured landfills where it has been placed under compaction. While the unconfined compressive strength may be on the order of 200 to 300 psi after a long curing time, the aggregate is still relatively soft and performs poorly in the Los Angeles abrasion test for measuring aggregate hardness (or abrasion resistance).

The formation of ettringite, a tricalcium alumino sulfate hydrate ($3CaO \cdot Al_2O_3 \cdot 3CaSO_4 \cdot 31H_2O$), also presents problems for cementitiously hardened products produced by the previous methods. The presence of ettringite in significant quantities is known to be destructive in Portland cement concrete. It is this mechanism that causes ordinary concrete to fail in the presence of sea water. This failure is due to expansion: The formation of ettringite within a mass causes expansion, largely due to the 31 molecules of water that are taken into the crystal formation of ettringite.

Although this destructive expansion is not normally seen in landfill disposal of FGD sludge-fly ash-lime compositions, it has been noted as a destructive force when this composition is utilized as a road construction base course. The same destructive force has been noted in laboratory sized Proctor specimens, in which FGD sludge-fly ash-lime compositions are prepared and compacted into Proctor cylinder molds, 4" in inside diameter and 4.5" in height. Formed specimens are then ejected from the molds for determination of density, unconfined compressive strength, etc. Careful measurements of the cylindrical specimens having ettringite have indicated growth of 5%, accompanied by severe cracking and structure failure due to internal stress release.

Ettringite forms due to the presence of calcium sulfate dihydrate, identified as gypsum, which is almost always present to some degree in FGD sludge. Assuming the coal combustion unit is operating with combustion zone dynamics limiting the level of oxygen present, a less oxidized form, calcium sulfite hemihydrate, will form. Given any reasonable degree of excess oxygen in the combustion system, which typically operates at 5% to 7% excess, some quantity of gypsum will be formed from the calcium sulfite hemihydrate during or after the scrubbing unless an oxidation inhibiting agent is added. The gypsum level is typically from about 1 to about 15% of the total alkaline earth metal-sulfur oxide compounds, with the remainder as calcium sulfite hemihydrate. In certain scrubbing operations, deliberate oxidation of the alkaline earth metal-sulfur compounds is forced by excessive air circulation through the scrubbing modules. In summary, all lime or limestone scrubbing units on pulverized coal boilers yield some quantity of calcium sulfate dihydrate or gypsum; this may range from about 1 to 100% but generally will be at least 10 % (by weight) of the sludge solids. Thus a problem with expansion in the cementitious hardening of formed or confined masses of a lime-fly ash-FGD sludge would normally be expected, almost regardless of the FGD sludge source

SUMMARY OF THE INVENTION

The present invention is a water-insoluble, abrasion-resistant, solid article or particulate sub-divisions thereof, formed by the hardening of a cementitious composition. This composition is an intimate mixture of fly ash, lime, FGD sludge and water. As a particulate material, the present invention preferably includes a gradation of particle-sizes, and is thus adapted to be used as an aggregate. The expansion-resistant, cementitiously hardened product of the present invention may include ettringite.

The method for making this cementitiously hardened product is also a part of the present invention. This method includes the steps of forming an intimate mixture of fly ash, lime, sludge and water, with the amount of water being near to or somewhat in excess of that required to form an optimum density mix; compressing the mixture to the point of water expression; and permitting this compressed mixture to react. As reacted, the composition of the intimate mixture includes at least 35% fly ash, at least 2.5% lime, and water in an amount from 5% less than to 5% more than the amount necessary to form an optimum density mixture. The preferred dry weight-based fly ash:sludge ratio is about 0.8:1.0, but this ratio may vary from 0.6:1.0 to 3.5:1.0.

Generally, the forming pressure used to compress this intimate mixture to the point of water expression will be in excess of 1000 psi, preferably from 4,000 psi to 8,000. The compressed mixture may be cured at a temperature from 50° F. to 100° F., and additional water may be applied by external means during curing.

The product of this invention is a high strength (unconfined compressive strength in excess of 1000 psi), abrasion resistant (LA abrasion resistance less than 60%) synthetic aggregate.

DETAILED DESCRIPTION

The first step in preparing the abrasion-resistant cementitiously hardened product of the present invention is to form an intimate mixture of fly ash, lime, sludge and water.

Definition of Terms

Fly ash is the fine, dry, particulate pozzolanic material emitted with the exhaust gas from a pulverized coal burning combustion unit. Because it is a pozzolan, fly ash can combine with water and an alkaline earth material, such as lime, to yield a cementitious reaction. Fly ash is generally separated from flue gases by the use of a mechanical collector or an electrostatic precipitator. Fly ash, for purposes of the present invention, may also comprise the fine ash recovered from the stack gases of oil combustion units or trash incinerators, to the extent these ashes are or may be pozzolanic. The minimum proportion of fly ash or other pozzolanic material required will depend on the pozzolanic activity of that material, which is measurable in accordance with the ASTM C-593 testing method. Based on the pozzolanic activity of a typical bituminous pulverized coal combustion ash (collected electrostatically), the hardenable composition used in the method of the present invention, and in forming the product of the present invention, should include at least 35% (dry weight basis, exclusive of lime) of such ash.

The term lime includes calcium oxide, or calcium oxide plus magnesium oxide (known as quicklime) as well as calcium hydroxide, or calcium hydroxide plus magnesium oxide or hydroxide (known as hydrated lime). By-product forms of quicklime or hydrated lime (e.g. acetylene, Portland cement or lime production byproducts) may substitute in whole or in part. The term lime should be distinguished from the term limestone, which refers to naturally occurring limestone, or dolomite generally consisting of calcium carbonate, or mixtures of calcium carbonate and magnesium carbonate. Lime quantities indicated herein are calculated as calcium quicklime on a dry weight basis. To the extent the lime reactant includes calcium hydroxide, magnesium oxide or hydroxide or other substitute lime contributors, the equivalent proportions thereof are determined by the conventional method for determining available calcium oxide.

Alternative waste material inclusions: still other waste materials may also be incorporated to the extent that these materials contribute lime and/or pozzolanic properties. Among such material are blast furnace slag, certain clays, and certain smelter fines, etc.

Flue gas desulfurization (FGD) scrubber sludge is the aqueous suspension of solids generated when flue gas is desulfurized by scrubbing with lime or limestone. The solids content of such sludge is generally on the order of about 9% (by weight), prior to dewatering, and about 70 to 90 % after dewatering. These solids include calcium sulfite hemihydrate and calcium sulfate dihydrate. Thus, at varying times in an operation, the sludge may contain from 0 to 100% calcium sulfite hemihydrate and 0 to 100% calcium sulfate dihydrate and water. Additionally, FGD sludge may include some fly ash, excess scrubbing agent and the like.

Sludge content in compositions of the present invention is measured on a dry weight basis and the amount of sludge which may be used in mixtures for purposes of the present invention is expressed by a fly ash:sludge ratio (based on dry weight).

Non-FGD sludge, to the extent such sludge is compositionally similar in that it comprises primarily alkaline earth metal sulfates and/or sulfites may be substituted in whole or in part for FGD sludge.

The terms "water-insoluble," "water expression" and "abrasion-resistant" are defined in the course of the further description of this invention which follows.

Industrial Utility

The primary use of the present invention is the disposal of, and the economical by-product utilization of, FGD sludge in a highly useful synthetic aggregate product.

Composition and Method Details

The dry weight-based fly ash:sludge ratio should be in the range of 0.6:1.0 to 3.5:1.0. Preferably, the dry weight-based fly ash:sludge ratio should be about 0.8:1.0 As shown in Table I, at this ratio, excellent results are obtained in the Los Angeles abrasion test.

TABLE I

| Fly Ash: Sludge (DWB) | Forming Pressure (psi) | Lime (% DWB) | Unconfined Compressive Strength (psi) | Los Angeles Abrasion Resistance (% Fines) |
|---|---|---|---|---|
| 0.6:1 | 10,000 | 4 | Not Run | 86.2 |
| 0.8:1 | 10,000 | 4 | 1500 | 49.4 |
| 0.6:1 | 15,000 | 4 | Not Run | 87.3 |
| 0.8:1 | 15,000 | 4 | 896 | 64.6 |

At least 35% fly ash and 2.5% lime (dry weight measured as calcium oxide, or calcium oxide equivalents) must also be included in the hardenable mixtures used in the present invention. Although the lime content may be as high as 6%, 4% is preferred.

The amount of water in the hardenable mixtures used in the present invention is from 5% less than to 5% more than the amount necessary to form an optimum density mixture. An optimum density mixture is a mixture of particulate solids and water that contains just enough water to fill all the interstices in the particulate solids mass. An optimum density mixture is often also the maximum dry density mixture which can be made in a combination of water with any given particulate material.

As previously stated, it is important that the above components are intimately mixed. In the laboratory, this requirement of intimately mixing the components can be accomplished by blending them in a Hobart N-50 laboratory blender for thirty seconds at the first speed.

Existing facilities, where fly ash-scrubber sludge-lime compositions are produced for landfill disposal, typically utilize a pugmill or equivalent. Modification of this type of mixer to increase retention time, or to incorporate increased agitator blade speed is an acceptable means of achieving the more intimate mixing required. As Table II demonstrates, unconfined compressive strength increases as the components are more intimately mixed. In Table II, "Normal Plant Composition" refers to a mixture made in a pugmill under normal conditions used in a commercial FGD sludge, fly ash, lime fixation system. "Somewhat Improved Mixing" refers to a mixture made by modifying the pugmill (reversing about a quarter of the agitator blades in the mill) which increases retention time significantly. "Nearly Homogeneous" refers to a mixture, which visually appears nearly homogeneous, made by further modifying the pugmill (reversing about two thirds of the agitator blades) to effect a still further significant increase in retention time. As a further indication of the enhanced mixing effect, it may be noted that the sludge solids in these mixtures normally occur as wet solid inclusions, sometimes referred as "sludge balls". These sludge balls range in size up to about one and one quarter inches in diameter in conventional fixation mixes ("Normal Plant Mix" in Table II). In the "Somewhat Improved Mix" of Table II, the maximum size of these sludge balls was generally less than one half inch and in the "Nearly Homogeneous Mix" the sludge ball inclusions ranged up to about one eighth inch in diameter.

TABLE II

| Solids (%) | Fly Ash: Sludge (DWB) | Lime DWB | Dry Density (LB/FT$^3$) | Unconfined Compressive Strength* (PSI) | Mixing Observation |
|---|---|---|---|---|---|
| 74.4 | 0.56:1 | 1.7 | 78.9 | 64 | Normal Plant Composition for Landfill |
| 74.6 | 0.50:1 | 1.8 | 79.1 | 74 | Somewhat Improved Mixing |
| 71.0 | 0.58:1 | 2.0 | 76.5 | 159 | Nearly Homogeneous |

*UCS values are the average of two specimens cured 7 days at 100° F.

The next step in making the abrasion-resistant, cementitiously-hardened product of the present invention is to compress the intimate mixture under a forming pressure to the point of water expression. The forming pressure is a function of the total compression energy expended on the intimate mixture.

After a certain amount of forming pressure is expended on the intimate mixture, water is squeezed out of the compositions. This is said to be the point of water expression, which usually occurs below 4,000 psi of forming pressure, after a few seconds. The water released from the molding operation increases with pressure and time. This loss of water may explain the poor abrasion-resistant characteristics of the final product at forming pressures above 7,500 psi. The relationship between the unconfined compressive strength (and presumably related Los Angeles abrasion resistance) versus the forming pressure expended is shown in Table III. From the results shown in Table III and other experimentation, it has been determined that a forming pressure range of 4,000 psi to 8,000 psi is preferred. This degree of compression may be accomplished in the field by roll briquettors, tableting rolls, or mechanical or hydraulic brick presses.

TABLE III

| Forming Pressure (psi) | Unconfined Compressive Strength (psi) | Los Angeles Abrasion Resistance (% Fines Produced) |
|---|---|---|
| 1000 | 1004 | 62 |
| 2400 | 1456 | 55 |
| 3750 | 1299 | 51 |
| 5000 | 1230 | 50 |
| 7500 | 1601 | 44 |
| 10000 | 1500 | 49 |
| 15000 | 896 | 64 |

Next, the compressed mixture must be permitted to react. This reaction is the known fly ash-lime pozzolanic reaction, which results in a cementitiously hardened product. This is accomplished by permitting the compressed mixture to cure at a cure temperature for a given curing time. In tests to date, cure temperatures of from 50° F. to 100° F. have been used. Generally the cure cycle should be at least equivalent to a 73° F. cure at 28 days time.

For practical purposes, the curing time is best expressed as a "73° F.-equivalent curing time." This term reflects the curing time that a compressed mixture would have to spend at 73° F. to be equivalently cured as it would be at a different curing temperature and curing time. It has been found that curing at 100° F. for 7 days is approximately equivalent to curing at 73° F. for 28 days or 50 degrees F. for 56 days; and curing at 100° F. for 14 days is approximately equivalent to curing at 73° F. for 56 days, etc.

Thus, to be equivalent to the desired minimum of a 100° F. cure for seven days, the 73° F.-equivalent curing time should be 28 days. As shown in Table IV, one sample which was cured at 73° F.-equivalent curing time for 56 days resulted in still greater abrasion resistance and unconfined compressive strength.

TABLE IV

| Actual Curing | 73° F. Equivalent | Unconfined Compressive Strength (psi) | Los Angeles Abrasion Resistance (% Fines Produced) |
|---|---|---|---|
| 7 Days @ 100° F. | 28 Days | 1601 | 44 |
| 14 Days @ 100° F. | 56 Days | 3978 | 33 |

As previously stated, the excessive expression of water during compaction may result in poor abrasion resistance and unconfined compressive strength. This problem is alleviated by applying additional water to the compressed mixture by external means during curing.

The final product is a pre-determined shape, the shape of the mold used during the compression of the intimate mixture. For example, it could be the shape and size of the Proctor cylinders (as in a laboratory test) or any other desired shape for which a mold could be made. This cured or hardened product (following curing) may be crushed and graded, making it appropriate for use as a synthetic aggregate. In this configuration, the final product is actually a particulate material, the individual particles of which are subdivisions of the water-insoluble, abrasion-resistant article resulting from the molding and subsequent reaction during curing of the intimate admixture described above. Preferably, this particulate material is composed of a gradation of particle sizes, by which it is best adapted for use as a high quality synthetic aggregate.

The final product produced from this method is a water-insoluble, abrasion-resistant, solid article having a predetermined shape (or sub-divisions thereof) and comprising the reaction product of an intimate and highly compressed mixture of fly ash, lime, sludge and water, in the proportions previously discussed. The final product is said to be water-insoluble because it does not soften, melt, or dissolve in water. The term "abrasion-resistant" applies to aggregates which have a reasonably good abrasion resistance value as determined by the Los Angeles abrasion resistance test. The synthetic aggregate produced in accordance with the present invention meets that standard in that it has been repeatedly demonstrated to produce an abrasion resistance value in the range of 30% to 60%, often below 45% and even below 40% under optimum conditions.

The values for abrasion resistance are expressed as the weight percentage lost by an article after undergoing the Los Angeles abrasion test as detailed in ASTM C535-89, entitled "RESISTANCE TO DEGRADATION OF LARGE-SIZE COARSE AGGREGATE BY ABRASION AND IMPACT IN THE LOS ANGELES MACHINE." This test involves rotating and grinding mineral aggregates in a steel drum and measuring the percentage of fines produced. These fines are then weighed, and are divided by the original weight to determine the weight percentage lost from the original aggregate. Whenever a percentage is given to indicate abrasion-resistance, the percentage represents the weight percentage of the original article which is lost after undergoing the Los Angeles abrasion test.

The Los Angeles abrasion-resistance test is important in determining which aggregates are permitted for use in construction of road surfaces. For example, the Florida Department of Transportation prohibits the use of an aggregate having an abrasion resistance over 45%; the Pennsylvania Department of Transportation prohibits the use of an aggregate having an abrasion resistance over 40% as high quality aggregate. Both of the samples shown in Table II meet the Florida requirement. The Pennsylvania requirement could be met by permitting the compressed mixture to cure for a longer period of time, as shown by the second sample listed in Table IV.

Although there has been strong evidence of ettringite formation and subsequent structural damage and failure in specimens, typical of the prior art, prepared at relatively low forming pressures, the product of this invention (with higher compression) does not show similar structural failure. However, the sludge does include calcium sulfate dihydrate, from which ettringite is formed. Furthermore, x-ray diffraction analysis clearly indicates the presence of ettringite in the cementitiously hardened product of this invention. Nonetheless, specimens of the present invention having a large surface area (brick-like specimens having dimensions of 18"×6"×2") have shown no expansiveness due to ettringite. This surprising characteristic may be attributable to the increased forming pressures of above 1000 psi, and preferably above 4,000 psi, used in the method of the present invention. Thus, the product of the present invention may also be described as a an expansion-resistant, cementitiously hardened article having ettringite as one of its components, at least in those mixes in which is incorporated a sulfate-containing sludge. Because of this resistance to expansion, the product of the present invention as an aggregate for road construction is particularly advantageous.

The aggregate of this invention is also characterized by high compressive strength in the hardened product; unconfined compressive strength, after normal curing, usually exceeds 1000 psi, and often reaches 1200–1600 psi under optimum conditions, as shown in Table III

EXAMPLES

The following examples are included to more clearly demonstrate the overall nature of the invention. These examples are comparative, not representative of the invention.

(COMPARATIVE) EXAMPLE 1

Fly ash, FGD sludge and high calcium quicklime were blended in a fly ash:sludge ratio of 0.8:1.0 (dry weight basis), with the addition of 4.0% high calcium quicklime (dry weight basis of sludge and fly ash). The compositions were blended in a Hobart N-50 laboratory for 30 seconds at the first speed. This blended product was compacted in Proctor cylinders 4" in diameter by 4.5" in height, utilizing existing American Society for Testing and Materials protocols.

Three samples underwent varying compactive effort, ranging from a total of 412 foot pounds energy expended to 1875 foot pounds. Dry density of the compacted specimens increases with increased compactive effort, as shown in Table V. These specimens were cured for 7 days at 100° F. (38° C.). After curing, the specimens were tested for unconfined compressive strength. As the test data indicate in Table V, increased compactive effort resulted in increased unconfined compressive strength (measured after curing). However, it should be noted that the maximum unconfined compressive strength achieved (399 psi) was, by physical observation, clearly too soft to be an adequate aggregate. These data simply confirm that which has previously been known. Increasing compressive effort from about 33 psi to about 149 psi provides an improvement in the cured properties of such compositions. However, the improvement is not sufficient for the production of synthetic aggregate.

TABLE V

| Compaction Protocol | ASTM Standard | ASTM Standard | Modified ASTM |
|---|---|---|---|
| Layers | 3 | 3 | 5 |
| Blows/Layer | 25 | 50 | 25 |
| Hammer (LBS.) | 5.5 | 5.5 | 10 |
| Drop (inches) | 12 | 12 | 18 |
| Total Energy (Ft./Lbs.) | 412 | 825 | 1875 |
| Compactive Effort (psi) | 33 | 66 | 149 |
| Solids Content (%) | 82.5 | 82.5 | 82.5 |
| Dry Density (Lb./Ft.$^3$) | 83.7 | 89.7 | 96.9 |
| Unconfined Comp. Strength (PSI), 7 days at 100° F. | 199 | 280 | 399 |

EXAMPLE II

Using the same composition as in Example I (fly ash:sludge ratio equal to 0.8:1.0 dry weight basis plus 4.0% lime), a batch was mixed utilizing a laboratory scale N-50 Hobart Planetary mixer. The resulting composition was formed into cylindrical specimens in a steel double piston mold at varied pressures. Specimens were formed at pressures from 1,000 psi to 15,000 psi. Resulting specimens were cured for 7 days at 100° F. (i.e. for a 73° F. equivalent curing time of 28 days), then tested for unconfined compressive strength and Los Angeles abrasion resistance. The data is shown in Table III (above). As Table III indicates, unconfined compressive strength data are somewhat irregular, but indicate that midrange pressures (2,400 to 10,000 psi) provide the range at which unconfined compressive strength is optimum. The Los Angeles abrasion test values, wherein low numbers are desirable, clearly show that the optimum forming pressure is at about 7,500 psi, and that increasing pressure beyond that point was counterproductive.

EXAMPLE III

In a continuation of the testing reported in Example II, some of the specimens pressed at 7,500 psi were cured for an additional 7 days at 100° F., resulting in a total 73° F. equivalent curing time of 56 days. In other words, this is approximately equivalent to two months under ambient conditions in the field or approximately 73° F. in the laboratory. Unconfined compressive strength values increased from the 7 day cure value of 1000 psi to a 14 day cure value of 2,000 psi. The corresponding change in Los Angeles abrasion resistance value was from 44 to 33 percent fines, clearly indicating the additional advantage of prolonged curing due to the slow generation of cementitious reaction products of the pozzolanic and sulfopozzolanic reactions. The results of this example are shown in Table IV.

EXAMPLE IV

In a limited examination of the critical nature of formulation in aggregate production, a composition similar to that in Examples II and III was prepared, with a fly ash to sludge ratio of 0.6:1.0 (dry weight basis). The composition preparation, specimen curing and testing were done as in previous Examples II and III. The test data clearly indicates a superiority of the 0.8:1.0 compositions. The results of this example are shown in Table I.

The fly ash used in the experiments, upon which were based the tables and examples set forth above, is an electrostatically collected bituminous coal fly ash from the Palatka, Florida facility of the Seminole Electric Cooperative, Inc.

The pozzolanic activity of that ash, measured in accordance with ASTM C-593, Section 9 (Lime-Pozzolan Strength Development), determined monthly over a period of approximately five years, averages over 1100 psi, —well above the 600 psi minimum specified in C-593.

While this invention has been disclosed with reference to specific embodiments, it is apparent that other embodiments and equivalent variations of this invention may be devised by those skilled in the art without departing from the true spirit and scope of this invention. The appended claims are intended to be construed to include all such embodiments and equivalent variations.

What is claimed:

1. A water-insoluble, abrasion-resistant, solid article having a shape of a mold and comprising the cured reaction product of an intimate mixture, based on the dry weight of fly ash, lime, FGD sludge and water, said mixture comprising 2.5% to 6.0% lime and a fly ash:sludge ratio in the range of 0.6:1.0 to 3.5:1, said article having an abrasion resistance, as tested by the Los Angeles abrasion resistance test, of below 60% and a cured unconfined compressive strength of above 1000 psi.

2. The article of claim 1 wherein said article has an abrasion resistance of below 45%.

3. The article of claim 1 wherein said FGD sludge includes calcium sulfate dihydrate and calcium sulfite hemihydrate.

4. A method of making an abrasion-resistant, cementitiously hardened product comprising the steps of:
    forming an intimate mixture of, based on the dry weight, 2.5% to 6% lime, at least 35% fly ash, FGD sludge in an amount such that the fly ash:FGD sludge ratio is from 0.6:1.0 to 3.5:1.0 and water in an amount of from 5% less than to 5% more than the amount necessary to form an optimum density mixture;
    compressing said mixture under a forming pressure of from 4000 psi to 8000 psi; and
    permitting said compressed mixture to react to form a product having a cured unconfined compressive strength of above 1000 psi.

5. The method of making an abrasion-resistant, cementitiously hardened product of claim 4 wherein said intimate mixture includes 4.0% to 6.0% lime.

6. The method of making an abrasion-resistant, cementitiously hardened product of claim 4 wherein said FGD sludge, includes calcium sulfite hemihydrate and calcium sulfate dihydrate.

7. The method of making an abrasion-resistant, cementitiously hardened product of claim 6 wherein:
    the dry weight-based fly ash:sludge ratio is at least 0.8:1.0; and
    said intimate mixture includes 4.0% lime.

8. The method of making an abrasion-resistant, cementitiously hardened product of claim 4 wherein said compressed mixture is permitted to cure at a curing temperature of 50° F. for a 73° F.-equivalent curing time of at least 28 days.

9. The method of making an abrasion-resistant, cementitiously hardened product of claim 8 wherein said compressed mixture is permitted to cure for a 73° F.-equivalent curing time of at least 56 days.

10. The method of making an abrasion-resistant, cementitiously hardened product of claim 4 further comprising applying additional water to said compressed mixture by external means during curing.

11. The method of making an abrasion-resistant, cementitiously hardened product of claim 4 further comprising crushing and grading said abrasion-resistant, cementitiously hardened product.

12. The method of making an abrasion-resistant, cementitiously hardened product of claim 7 wherein said compressed mixture is permitted to cure at a curing temperature of 50° F. to 100° F. for a 73° F.-equivalent curing time of at least 28 days.

13. The method of making an abrasion-resistant, cementitiously hardened product of claim 12 wherein said compressed mixture is permitted to cure for a 73° F.-equivalent curing time of at least 56 days.

14. The method of making an abrasion-resistant, cementitiously hardened product of claim 7 further comprising applying additional water to said compressed mixture by external means during curing.

15. The method of making an abrasion-resistant, cementitiously hardened product of claim 7 further comprising crushing and grading said abrasion-resistant, cementitiously hardened product.

16. An abrasion resistant synthetic aggregate produced by the method of claim 11.

17. A water-insoluble, abrasion-resistant particulate material, for use as an aggregate, comprising the cured reaction product of an intimate mixture, based on the dry weight, of fly ash, lime, FGD sludge and water, said mixture comprising 2.5% to 6.0% lime and fly ash:-sludge ratio in the range of 0.6:1.0 to 3.5:1, said article having a cured abrasion resistance, as tested by the Los Angeles abrasion resistance test, of below 60% and an unconfined compressive strength of above 1000 psi.

18. The particulate material of claim 17, wherein said particulate material is a gradation of particle-sizes.

* * * * *